United States Patent
Jain et al.

(10) Patent No.: US 7,289,455 B2
(45) Date of Patent: Oct. 30, 2007

(54) NETWORK STATISTICS

(75) Inventors: Sanjeev Jain, Shrewsbury, MA (US); Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 996 days.

(21) Appl. No.: 10/628,997

(22) Filed: Jul. 28, 2003

(65) Prior Publication Data
US 2005/0025055 A1     Feb. 3, 2005

(51) Int. Cl.
*H04J 1/16* (2006.01)
(52) U.S. Cl. .................... 370/253; 370/235; 370/229; 709/224
(58) Field of Classification Search ............... 370/252, 370/253, 235, 229, 230, 392, 401; 709/224
See application file for complete search history.

(56) References Cited

U.S. PATENT DOCUMENTS 5,668,798 A * 9/1997 Toubol et al. ............... 370/230
7,016,932 B2 * 3/2006 Kantabutra et al. ......... 708/712
7,020,085 B2 * 3/2006 Mimura et al. ............. 370/235
2001/0021176 A1 * 9/2001 Mimura et al. ............. 370/235
2007/0005878 A1 * 1/2007 Regev et al. ................ 711/108

* cited by examiner

*Primary Examiner*—Ricky Q. Ngo
*Assistant Examiner*—Gary Mui
(74) *Attorney, Agent, or Firm*—Robert A. Greenberg

(57) ABSTRACT

In general, in one aspect, a method is provided for of tracking a network statistic stored within a collection of bits. The method includes storing the collection of bits storing the network statistic as at least a first portion and a second portion. The first portion includes a set of least-significant bits and the second portion includes a set of more significant bits. The method also includes incrementing the first portion based on a packet and determining if the incrementing of the first portion caused a designated bit of the first portion to be set. If it is determined that the incrementing of the first portion caused the designated bit to be set, the method increments the value stored by the second portion and resets the designated bit within the first portion.

33 Claims, 8 Drawing Sheets

NETWORK STATISTICS

BACKGROUND

Networks enable computers and other devices to communicate. For example, networks can carry data representing video, audio, e-mail, and so forth. Typically, data sent across a network is divided into smaller messages known as packets. By analogy, a packet is much like an envelope you drop in a mailbox. A packet typically includes "payload" and a "header". The packet's "payload" is analogous to the letter inside the envelope. The packet's "header" is much like the information written on the envelope itself. The header can include information to help network devices handle the packet appropriately. For example, the header can include an address that identifies the packet's destination.

A given packet may "hop" across many different intermediate network devices (e.g., "routers", "bridges" and "switches") before reaching its destination. These intermediate devices often perform a variety of packet processing operations. For example, intermediate devices often perform address lookup and packet classification to determine how to forward a packet further toward its destination or to determine the quality of service to provide. Typically, an intermediate device features a number of different interfaces that connect to the intermediate device to other network devices.

Many network devices compile statistics on their operation. For example, devices can compile statistics indicating the number of packets or bytes received or transmitted. In addition to device-wide statistics, the statistics may be compiled at a finer level, such as the number of packets or bytes received over a particular interface or within a particular packet flow.

DETAILED DESCRIPTION

Network devices often compile statistics metering their operation. For example, a device may compile statistics that identify the number of packets (packet count) or bytes (byte count) received or transmitted over a given interface or within a packet flow. For instance, a counter may be incremented for each packet or byte received. Some systems use 32-bit counters to store a statistic value. A 32-bit counter can count up to $2^{32}$ or 4,294,967,296. After reaching this maximum value, however, logic causes the counter to wrap-over to zero (much like an odometer).

As the speed of network connections increase, the minimum time in which a 32-bit statistics counter will wrap decreases. For example, a 10 Megabits/second stream of back-to-back full size packets will cause a byte counter to wrap in just 57 minutes. At 1-Gigabits/second, the minimum wrap time is just 34 seconds. At 10 Gigabits/second and 40 Gigabits/second these wrap times are even shorter. Thus, using a 32-bit counter is becoming increasingly problematic.

RFC 2863 ("The Interfaces Group MIB", K. McCloghrie, June 2000), addressed this issue and proposed that interfaces that operate at 20-Megabits/second or greater should use 64-bits to store network statistic data in place of 32-bit statistics. This increase in data size, however, can represent a significant memory bandwidth burden. That is, repeatedly reading and writing 64-bits of memory can consume significant memory sub-system resources.

Generally, this description describes an approach that divides a counter into different portions that can be accessed individually. For example, a 64-bit counter may be divided into a high portion of the 32 most significant bits and a low portion of the 32 least significant bits. A device can regularly update the low portion as packets and/or bytes are processed, but access the high portion infrequently, as needed. Thus, while the different portions combine to store a large value, memory operations remain efficient by operating on smaller "chunks" of data.

Figure 1:
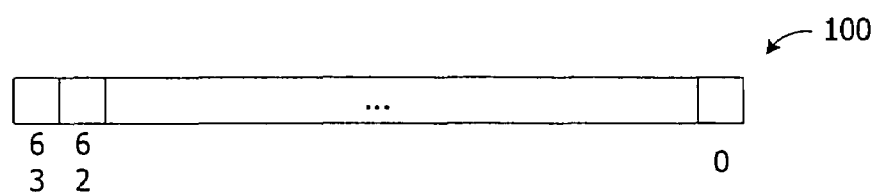
FIG. 1 is a diagram of bits storing a network statistic value.

In greater detail, FIG. 1 depicts an example of a traditional 64-bit counter 100. In this example, the value stored at bit-0 represents the least significant bit of the counter 100, while the value stored at bit-63 represents the most significant bit. As shown, in FIG. 2, in contrast to the traditional counter 100, counter 102 is divided into two portions 102a, 102b. The lower portion 102b includes the least significant bits of the counter 102 while the higher portion 102a includes the more significant bits. The vast majority of the time, the device can update the lower portion 102b as each packet and/or byte is handled without performing a memory operation (e.g., reading and/or incrementing) on the upper portion 102a. However, eventually, the upper portion 102a will need to be incremented.

Figure 2:
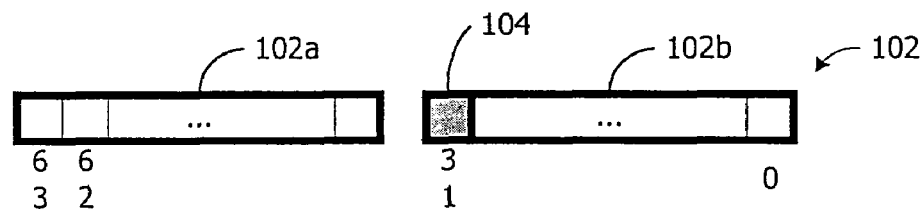
FIG. 2 is a diagram of bits storing a network statistic value divided into portions.

As shown in FIG. 2, a bit 104 (e.g., bit-31) is reserved in the lower portion 102b to identify when the upper portion 102a should be updated. In the example shown, bit 104 is the most significant bit of the lower portion 102b. When an increment of the lower portion 102b sets bit 104, logic can initiate an increment of the upper portion 102a and reset bit 104. Reserving bit 104 for this use means that the 64-bits only store a 63-bit statistic value. However, the wrap time for a 63-bit byte count exceeds 100-years for a 10-Gigabits/second flow.

The counter 102 shown in FIG. 2 is an example of an approach that can work with a variety of bit widths (e.g., 128-bits, 256-bits, and so forth), not just 64-bits. More generally, the approach divides the bits storing a network statistic value into multiple ($\geq 2$) portions. A lowest portion includes the least-significant bits of which are incremented with each packet/byte. The other portion(s) stores more significant bits. Again, in the vast majority of cases, updating the counter only involves memory operations on the low portion.

Figure 3A:
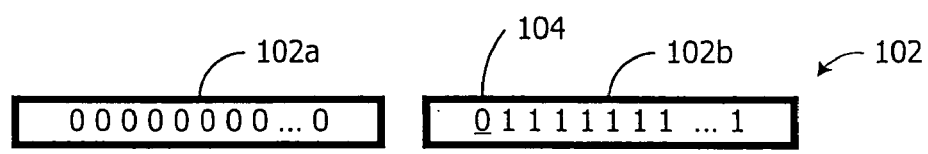
FIGS. 3A-3C are diagrams illustrating an update of a network statistic.
Figure 3B:
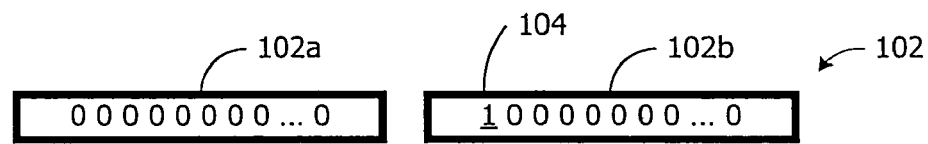
Figure 3C:
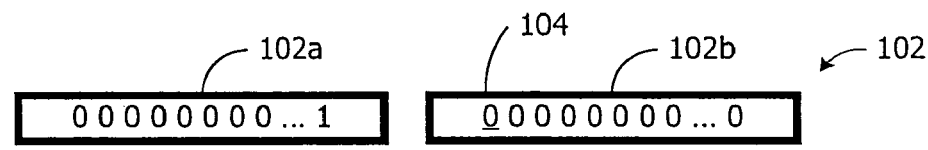

FIGS. 3A-3C illustrate an example of a counter update. As shown in FIG. 3A, the lower portion 102b of a counter 102 has a value of all 1-s with the exception of the lower portion's 102b most significant bit 104. The 32-bits of the upper portion 102a in this example have bit values of "0". The value of the statistic stored within the 64-bits is determined by the upper portion's 32-bits and the least significant 31-bits of the lower portion (i.e., the lower portion 102 bits other than bit 104).

As shown in FIG. 3B, incrementing the lower portion 102b sets the lower portion's 102b most significant bit 104 to "1" and resets the remaining lower portion 102b bits to "0". The setting of the most significant bit 104 indicates that an increment of the upper portion 102a should occur. Before the upper portion 102a is incremented, however, the statistic value derived from the 32-bits of the upper portion 102a and the lower 31-bits of the lower portion 102b inaccurately indicates a statistic value of "0". Thus, a request to read the full statistic value during this time may be deferred until the upper portion 102b is updated. Finally, as shown in FIG. 3C, the upper portion 102a is incremented and the most significant bit 104 of the lower portion 102b is reset.

Figure 4:
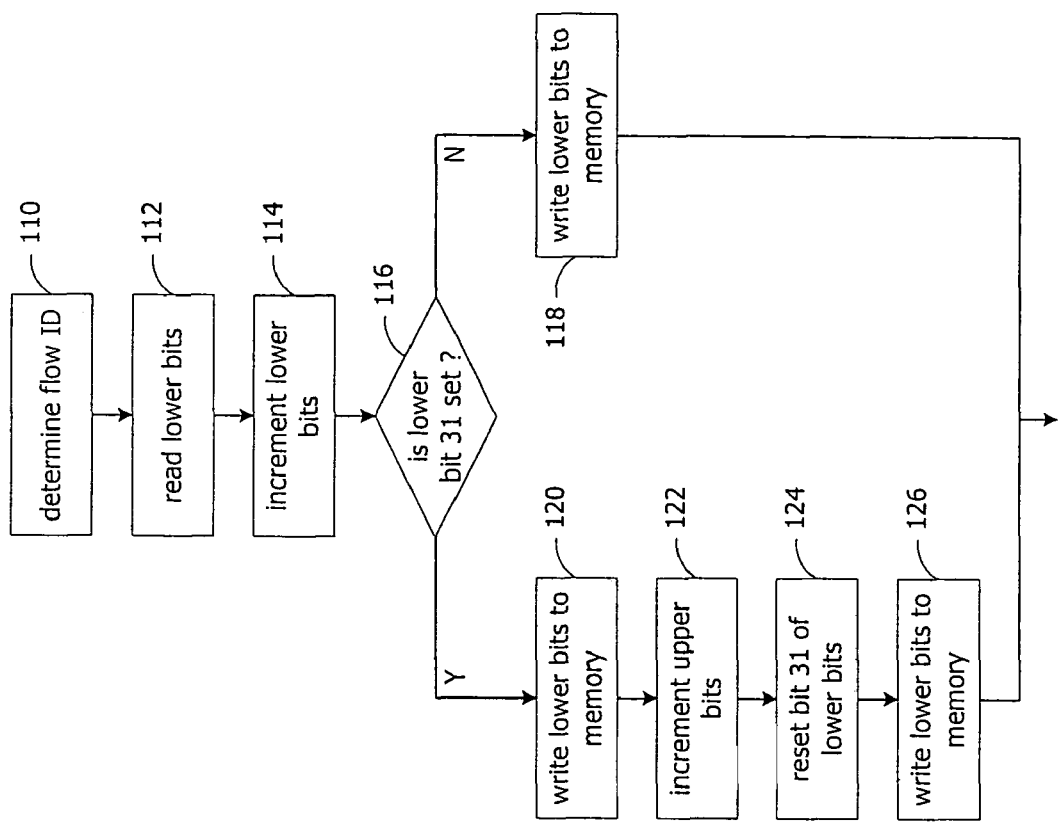
FIG. 4 is a flow-chart of a process to update a network statistic.

FIG. 4 depicts a flow-chart of a process for updating a packet or byte counter for a particular flow. As shown, the process determines 110 a flow identifier for a given packet. For example, the flow may be an Asynchronous Transfer Mode (ATM) virtual circuit or path identifier or a Transmission Control Protocol/Internet Protocol (TCP/IP) flow identified by a combination of a packet's IP source and destination addresses, source and destination ports, transport layer protocol, type of service (ToS) identifier, and/or other packet contents. Flows may correspond to a variety of other parameters associated with a packet (e.g., quality of service (QoS)).

After reading 112 and incrementing 114 the lower portion of a counter associated with the flow identifier, the process can determine 116 if the bit identifying when to update the upper portion was set in the course of incrementing 114 the lower portion. If not, the process can write 118 the lower portion back to memory. However, if the bit has been set, the process writes 120 the lower portion back to memory and initiates the memory operation(s) to increment 122 the upper portion. When the operation(s) complete, the process resets 124 the identifying bit in the lower portion and again writes 126 the lower portion to memory.

Figure 5:
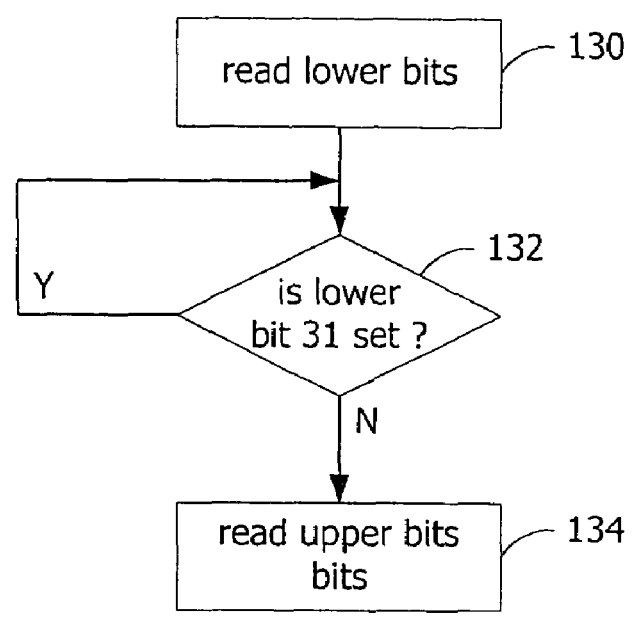
FIG. 5 is a flow-chart of a process read the value of a network statistic.

Many different processes may attempt to access the statistic value concurrent with updating of the statistic (e.g., in response to continually arriving packets). FIG. 5 depicts a sample process to access the statistic value. As shown, after retrieving 130 the lower portion of a counter being read, the process determines 132 if an update of the upper portion is indicated (e.g., the most significant bit of the first portion is set). If so, the process can await its completion. Otherwise, the upper portion can be retrieved 134 and joined with bits of the lower portion to yield the full statistic value.

Figure 6:
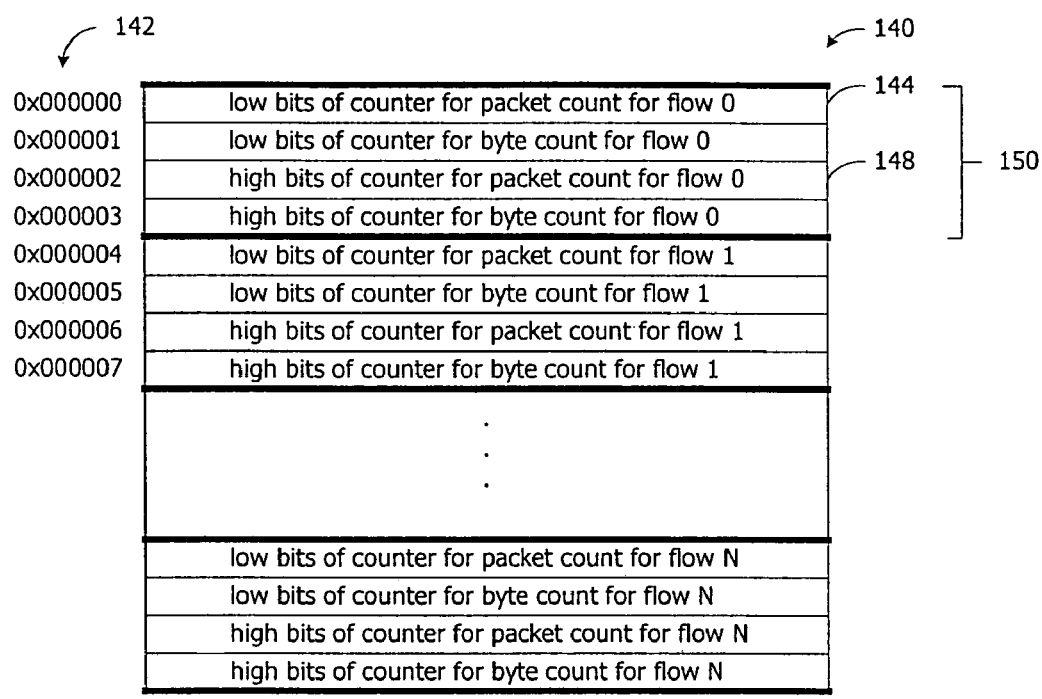
FIG. 6 is a map of memory storing portions of network statistic values.

A given device may track statistics for many different interfaces, ports, and/or packet flows. As an example, FIG. 6 depicts a map of memory storing network statistics for many different packet flows. In this case, a packet count and byte count are maintained for an individual flow 150. As shown, the memory stores the different portions of the counters in different locations. For example, the high portion of the packet counter for flow 0 is stored at address "0x000002" 148 while the low portion is stored at address "0x000000" 144. Potentially, the high and low portions may be stored in consecutive addresses instead of discontiguous ones. To access a portion of a counter value, the address of the portion can be computed based on a flow index (e.g., numeric flow identifier) and the base address of the map (e.g., 0x000000).

Though FIG. 6 depicts the portions as occupying consecutive addresses within a memory map, the portions may be distributed across different memories, potentially, having discontiguous address spaces. For example, the more frequently updated lower portions may be stored in faster SRAM (Static Random Access Memory) while the less frequently updated portions may be stored in slower DRAM (Dynamic Random Access Memory). The off-loading of storage from more expensive SRAM increase system economy without significant performance penalty.

Figure 7:
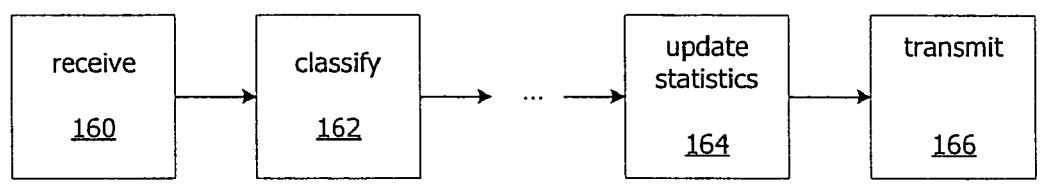
FIG. 7 is a flow-diagram of a packet processing system.

FIG. 7 depicts a sample flow of operations of a network device using techniques described above. As shown, the device features a receive process 160 that assembles packets as they arrive. After arrival, the packets are classified, for example, into different flows by a classification process 162. To classify the packets, the process 162 may examine the header(s) of a packet and perform lookups of associated information such as a flow identifier. The device can then update 164 the appropriate network statistic(s). The device may perform other operations (not shown) such as a table lookup to determine how to handle the packet (e.g., a lookup of filtering, quality of service, and/or forwarding data). Potentially, the packets may be transmitted 166 to the appropriate egress interface for the packet's next hop.

Figure 8:
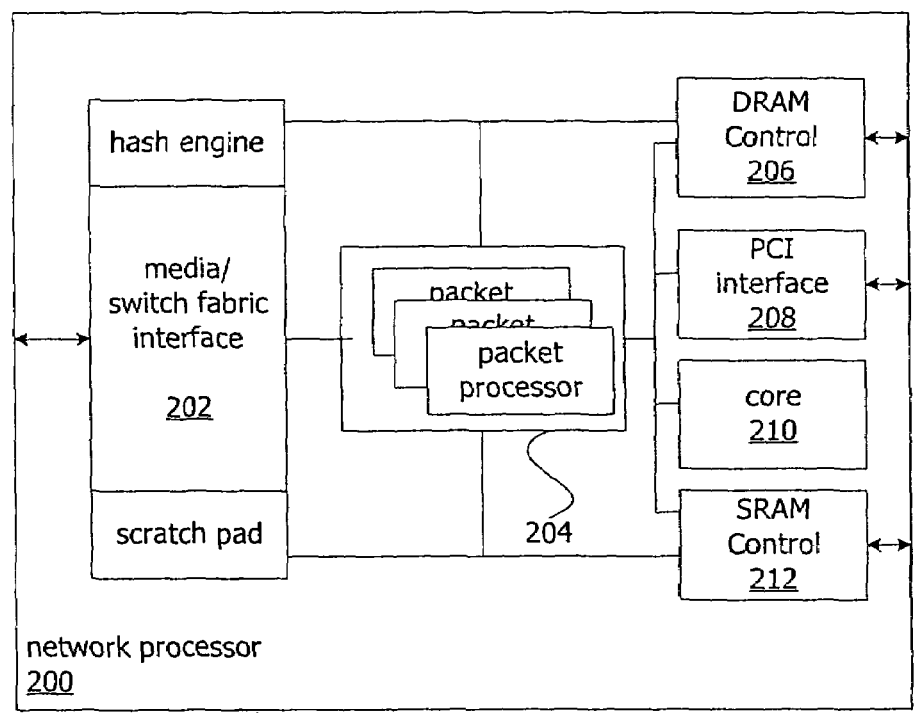
FIG. 8 is a diagram of a network processor.

The techniques described above may be used by a variety of network systems. For example, the techniques described above may be implemented by a programmable network processor. FIG. 8 depicts an example of network processor 200. The network processor 200 shown is an Intel® Internet exchange network Processor (IXP). Other network processors feature different designs.

The network processor 200 shown features a collection of packet engines 204. The packet engines 204 may be Reduced Instruction Set Computing (RISC) processors tailored for packet processing. For example, the packet engines 204 may not include floating point instructions or instructions for integer multiplication or division commonly provided by general purpose processors.

An individual packet engine 204 may offer multiple threads. For example, the multi-threading capability of the packet engines 204 may be supported by hardware that reserves different registers for different threads and can quickly swap thread contexts. In addition to accessing shared memory, a packet engine may also feature local memory and a content addressable memory (CAM). The packet engines 204 may communicate with neighboring processors 204, for example, using neighbor registers wired to the adjacent engine(s) or via shared memory.

The processor 200 also includes a core processor 210 (e.g., a StrongARM® XScale®) that is often programmed to perform "control plane" tasks involved in network operations. The core processor 210, however, may also handle "data plane" tasks and may provide additional packet processing threads.

As shown, the network processor 200 also features interfaces 202 that can carry packets between the processor 200 and other network components. For example, the processor 200 can feature a switch fabric interface 202 (e.g., a CSIX interface) that enables the processor 200 to transmit a packet to other processor(s) or circuitry connected to the fabric. The processor 200 can also feature an interface 202 (e.g., a System Packet Interface Level 4 (SPI-4) interface) that enables to the processor 200 to communicate with physical layer (PHY) and/or link layer devices. The processor 200 also includes an interface 208 (e.g., a Peripheral Component Interconnect (PCI) bus interface) for communicating, for example, with a host. As shown, the processor 200 also includes other components shared by the engines such as memory controllers 206, 212, a hash engine, and scratch pad memory.

The packet processing techniques described above may be implemented on a network processor, such as the IXP, in a wide variety of ways. For example, one or more threads of a packet engine 204 may execute instructions for updating and/or reading the network statistics. Additionally, the memory locations storing the network statistics may be distributed across the memory sub-systems in a variety of ways (e.g., lower portions in SRAM, higher portions in higher latency DRAM). Further, for even faster access, the lower portions of the statistic counters may be cached in the local memory of a packet engine performing statistic updates or reads. To identify which portions have been cached, the addresses of cached counter portions may be stored in an engine's CAM.

Figure 9:
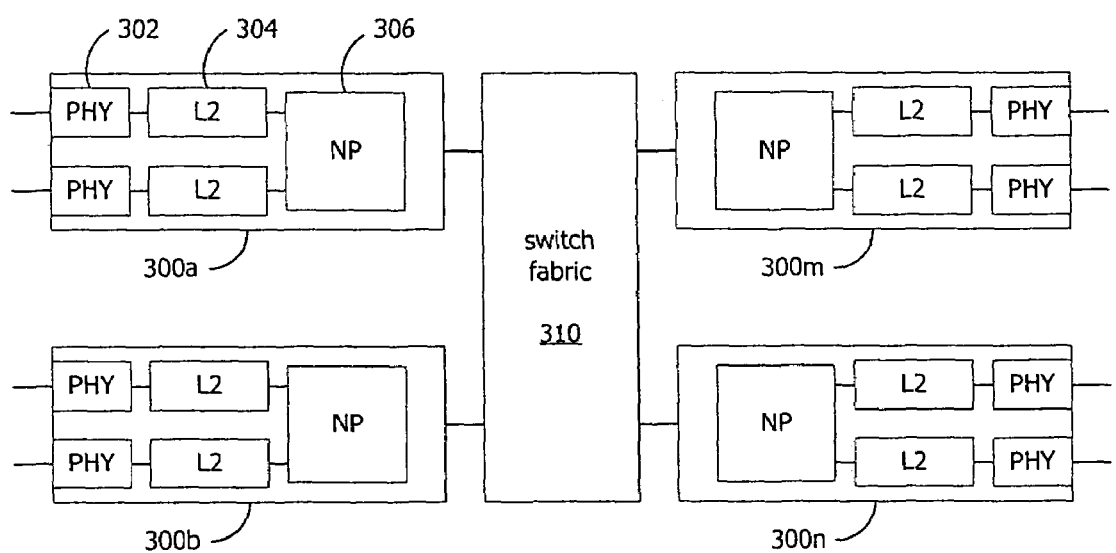
FIG. 9 is a diagram of a network device.

FIG. 9 depicts a network device incorporating techniques described above. As shown, the device features a collection of line cards 300 ("blades") interconnected by a switch fabric 310 (e.g., a crossbar or shared memory switch fabric). The switch fabric, for example, may conform to CSIX or other fabric technologies such as HyperTransport, Infiniband, PCI-X, Packet-Over-SONET, RapidIO, and Utopia.

Individual line cards (e.g., 300a) include one or more physical layer (PHY) devices 302 (e.g., optic, wire, and wireless PHYs) that handle communication over network connections. The PHYs translate between the physical signals carried by different network mediums and the bits (e.g., "0"-s and "1"-s) used by digital systems. The line cards 300 may also include framer devices (e.g., Ethernet, Synchronous Optic Network (SONET), High-Level Data Link (HDLC) framers or other "layer 2" devices) 304 that can perform operations on frames such as error detection and/or correction. The line cards 300 shown also include one or more network processors 306 or integrated circuits (e.g., ASICs) that perform packet processing operations for packets received via the PHY(s) 300 and direct the packets, via the switch fabric 310, to a line card providing the selected egress interface. Potentially, the network processor(s) 306 may perform "layer 2" duties instead of the framer devices 304.

While FIGS. 8 and 9 described a network processor and a device incorporating network processors, the techniques may be implemented in other hardware, firmware, and/or software. For example, the techniques may be implemented in integrated circuits (e.g., Application Specific Integrated Circuits (ASICs), Gate Arrays, and so forth). Additionally, the techniques may be applied to a wide variety of networking protocols at different levels in a protocol stack and in a wide variety of network devices (e.g., a router, switch, bridge, hub, traffic generator, and so forth).

The term packet was sometimes used in the above description to refer to an IP packet encapsulating a TCP segment. However, a packet may also be a frame, fragment, ATM cell, and so forth, depending on the network technology being used. Additionally, while the description above described network statistics such as packet count and byte count, a variety of other statistics may be handled using techniques described above (e.g., dropped packets, exceptions, and so forth).

Preferably, the threads are implemented in computer programs such as a high level procedural or object oriented programming language. However, the program(s) can be implemented in assembly or machine language if desired. The language may be compiled or interpreted. Additionally, these techniques may be used in a wide variety of networking environments.

Other embodiments are within the scope of the following claims.

What is claimed is:

1. A method of tracking a network statistic stored within a collection of bits, comprising:
storing the collection of bits storing the network statistic as at least a first portion and a second portion, the first portion including a set of least-significant bits and the second portion including a set of more significant bits;
incrementing the first portion independently of the second portion based on a packet;
determining if the incrementing of the first portion caused a designated bit of the first portion to be set; and
if it is determined that the incrementing of the first portion caused the designated bit to be set:
incrementing the value stored by the second portion; and
resetting the designated bit within the first portion.

2. The method of claim 1, wherein incrementing the first portion comprises performing at least one memory operation on the first portion and performing no memory operations on the second portion.

3. The method of claim 1, wherein the network statistic comprises one of the following: a packet count and a byte count.

4. The method of claim 1, wherein the network statistic comprises one of the following: a per flow statistic, a per ingress interface statistic, and a per egress interface statistic.

5. The method of claim 1, further comprising:
reading the first portion; and
if it is determined that the designated bit of the first portion is not set, reading the second portion.

6. The method of claim 1, further comprising:
determining a flow identifier of a packet based on packet characteristics; and
based on the determined flow identifier, determining the location of at least one of the portions within a memory storing network statistics for multiple flows.

7. The method of claim 6, further comprising:
storing at least some of the first portions of network statistics for different flows in a first memory sub-system; and
storing second portions of the network statistics for the different flows in a second memory sub-system.

8. The method of claim 1, wherein
the network statistic comprises a value represented by 63-bits within a set of 64-bits;
the first portion comprises 32-bits; and
the second portion comprises 32-bits.

9. The method of claim 1, wherein the designated bit of the first portion comprises the most-significant bit of the first portion.

10. A method of tracking a network statistic stored within 64-bits, comprising:
storing an upper 32-bits of the 64-bits storing the network statistic in a first storage location, 63 of the 64-bits identifying the value of the network statistic;
storing a lower 32-bits of the 64-bit value in a second storage location;
incrementing the value stored by the lower 32-bits independently of the upper 32-bits based on a received packet; and
in response to the setting of the most significant bit of the lower 32-bits:
incrementing the upper 32-bits; and
resetting the most significant bit of the lower 32-bits.

11. The method of claim 10, wherein the network statistic comprises one of the following: a packet count and a byte count.

12. The method of claim 10, wherein the network statistic comprises one of the following: a per flow statistic, a per ingress interface statistic, and a per egress interface statistic.

13. The method of claim 10, further comprising:
reading the lower 32-bits of the 64-bit value; and
if it is determined that the most significant bit of the lower 32-bits is not set, reading the upper 32-bits of the 64-bit value.

14. The method of claim 10, further comprising
determining a flow identifier of a packet based on packet characteristics; and
based on the determined flow identifier, determining the location of one of the 32-bit portions within a table storing statistics for multiple flows.

15. The method of claim 14, further comprising:
storing at least some of the upper 32-bit portions of network statistics for multiple flows in a first memory sub-system; and
storing lower 32-bit portions of network statistics for multiple flows in a second memory sub-system.

16. A computer program product, disposed on a computer readable medium, to track a network statistic stored within a collection of bits, the program including computer executable instructions for causing at least one processor to:
store the bits storing the network statistic as at least a first portion and a second portion, the first portion including a set of least-significant bits and the second portion including a set of more significant bits of the bits of the network statistic;
increment the first portion independently of the second portion based on a received packet;
determine if the incrementing of the first portion caused a designated bit of the first portion to be set; and
if it is determined that the incrementing of the first portion caused the designated bit to be set:
increment the value stored by the second portion; and
reset the designated bit within the first portion.

17. The program of claim 16, wherein computer executable instructions for causing the at least one processor to increment the first portion comprise instructions for causing the at least one processor to perform at least one memory operation on the first portion and perform no memory operations on the second portion.

18. The program of claim 16, wherein the network statistic comprises one of the following: a packet count and a byte count.

19. The program of claim 16, wherein the network statistic comprises one of the following: a per flow statistic, a per ingress interface statistic, and a per egress interface statistic.

20. The program of claim 16, further comprising computer executable instructions for causing at least one processor to:
read the first portion; and
if it is determined that the most significant bit of the first portion is not set, read the second portion.

21. The program of claim 16, further comprising computer executable instructions for causing at least one processor to:
determine a flow identifier of a packet based on packet characteristics; and
based on the determined flow identifier, determine the location of at least one of the portions within a memory storing network statistics for multiple flows.

22. The program of claim 21, further comprising computer executable instructions for causing at least one processor to:
store first portions of network statistics for multiple flows in a first memory sub-system; and
store second portions of the network statistics for the multiple flows in a second memory sub-system.

23. The program of claim 16, wherein
the network statistic value comprises 63-bits included within a set of 64-bits;
the first portion comprises 32-bits; and
the second portion comprises 32-bits.

24. The program of claim 16, further comprising computer executable instructions to cache the first portion in a local memory of a network processor packet engine.

25. A network processor, comprising:
at least one interface to receive data of packets received over a network;
multiple packet engines; and
a computer program product, disposed on a computer readable medium, to cause the multiple packet engines to:
store the bits storing the network statistic as at least a first portion and a second portion, the first portion including a set of least-significant bits and the second portion including a set of more significant bits of the bits of the network statistic;
increment the first portion based on a received packet;
determine if the incrementing of the first portion caused a designated bit of the first portion to be set; and
if it is determined that the incrementing of the first portion caused the designated bit to be set:
increment the value stored by the second portion; and
reset the designated bit within the first portion.

26. The processor of claim 25, wherein instructions for causing at least one engine to increment the first portion comprise instructions for causing the at least one engine to perform at least one memory operation on the first portion and perform no memory operations on the second portion.

27. The processor of claim 25, wherein the network statistic comprises one of the following: a packet count and a byte count.

28. The processor of claim 25, further comprising instructions for causing at least one engine to:
read the first portion; and
if it is determined that the designated bit of the first portion is not set, read the second portion.

29. The processor of claim 25, further comprising instructions for causing at least one engine to:
determine a flow identifier of a packet based on packet characteristics; and
based on the determined flow identifier, determine the location of at least one of the portions within a memory storing network statistics for multiple flows.

30. The processor of claim 29, further comprising instructions for causing at least one of the engines to:
store first portions of network statistics for multiple flows in a first memory sub-system; and
store second portions of network statistics for multiple flows in a second memory sub-system.

31. The network processor of claim 25, wherein the multiple packet engines comprise engines having hardware contexts for different execution threads.

32. A system to process packets received over a network, the system comprising:
multiple line cards, an individual line card including:
at least one physical layer component (PHY); and
at least one network processor having multiple packet engines having access to instructions to cause the at least one of the multiple packet engines to:

store the bits storing the network statistic as at least a first portion and a second portion, the first portion including a set of least-significant bits and the second portion including a set of more significant bits of the bits of the network statistic;

increment the first portion based on a received packet;

determine if the incrementing of the first portion caused a most significant bit of the least-significant bits to be set; and if it is determined that the incrementing of the least-significant bits caused the most significant bit of the first portion to be set:

increment the value stored by the more significant bits; and reset the most significant bit of the first portion; and a switch fabric interconnecting the multiple line cards.

33. The system of claim 32, wherein the network statistic comprises one of the following: a packet count and a byte count;

wherein the network statistic comprises one of the following: a per flow statistic, a per ingress interface statistic, and a per egress interface statistic;

wherein the network statistic comprises a value identified by 63-bits included within a set of 64-bits;

wherein the first portion comprises 32-bits;

wherein the second portion comprises 32-bits;

further comprising instructions for causing at least one engine to:

determine a flow identifier of a packet based on packet characteristics; and based on the determined flow identifier, determine the location of at least one of the portions within a memory storing network statistics for multiple flows; and further comprising instructions for causing at least one processor to:

read the first portion; and if it is determined that the most significant bit of the first portion is set, read the second portion.

* * * * *